Figure 1:
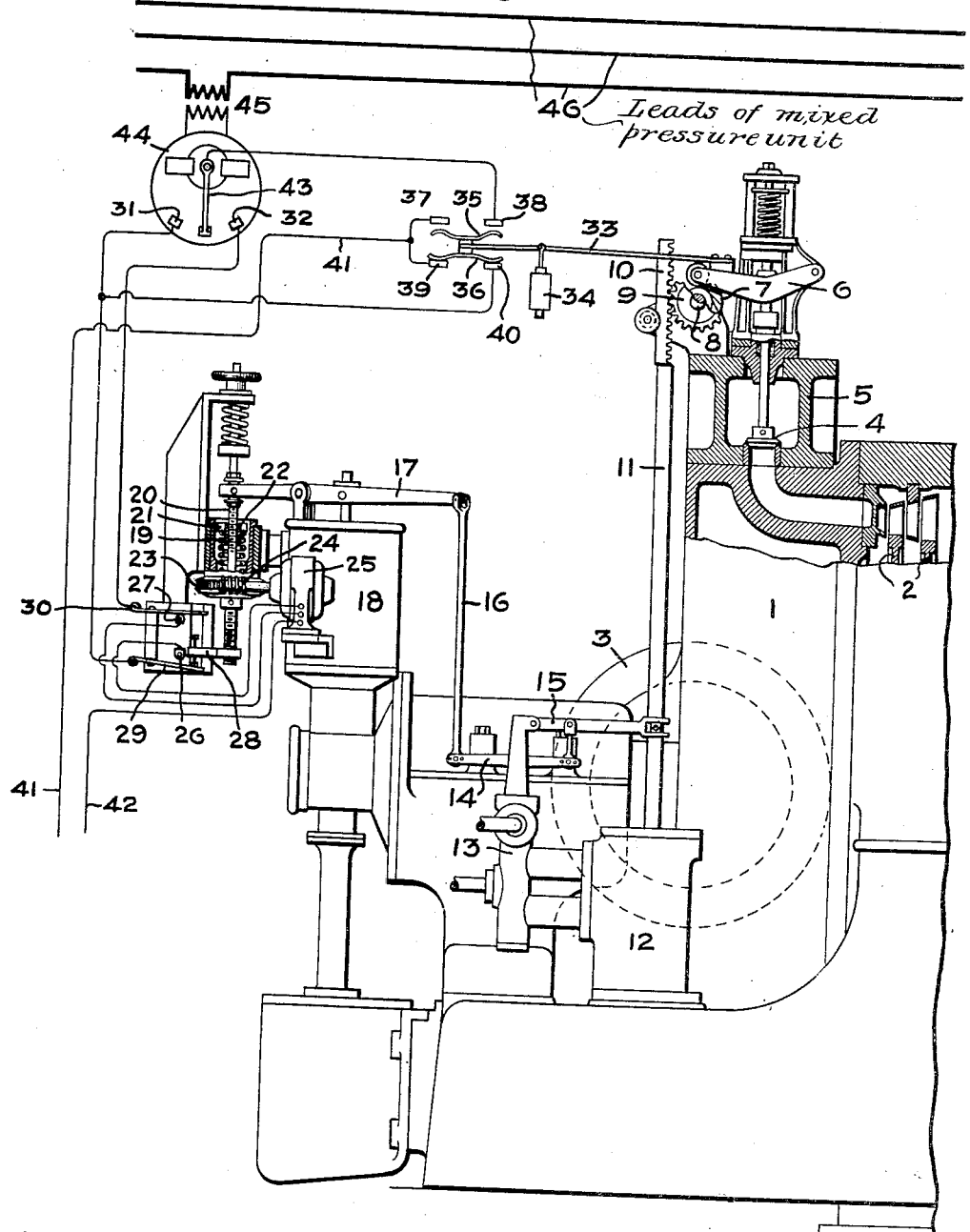

J. G. CALLAN.
GOVERNING MECHANISM FOR MIXED PRESSURE TURBINES.
APPLICATION FILED SEPT. 28, 1912.

1,159,174.

Patented Nov. 2, 1915.
3 SHEETS—SHEET 3.

Witnesses:
Marcus L. Byng.
J. Ellis Glen

Inventor:
John G. Callan,
by Albert G. Davis
His Attorney

UNITED STATES PATENT OFFICE.

JOHN G. CALLAN, OF BOSTON, MASSACHUSETTS, ASSIGNOR TO GENERAL ELECTRIC COMPANY, A CORPORATION OF NEW YORK.

GOVERNING MECHANISM FOR MIXED-PRESSURE TURBINES.

1,159,174.  Specification of Letters Patent.  Patented Nov. 2, 1915.

Application filed September 28, 1912. Serial No. 722,928.

*To all whom it may concern:*

Be it known that I, JOHN G. CALLAN, a citizen of the United States, residing at Boston, county of Suffolk, State of Massachusetts, have invented certain new and useful Improvements in Governing Mechanism for Mixed-Pressure Turbines, of which the following is a specification.

Where high-pressure engine units such as turbines for example, are employed to drive alternating current generators connected in parallel, each turbine unit will slow down only as the load increases and in consequence of said load. Under these conditions each speed governor will determine the proper valve opening to admit the requisite amount of steam to drive the load on its turbine. In other words, the load is the only variable.

When mixed pressure turbines are used to drive alternating current generators connected in parallel with other alternators driven by high-pressure engine units, the problem is much more complex. For economic reasons a mixed pressure turbine should normally use substantially all of the available low-pressure steam, and be rated at a load which this amount of steam will carry with normal vacuum. With such a turbine, speed reduction may be due, first, to increase in load, second, to a deficiency in the low-pressure steam supply and third, to a drop in vacuum. In other words, there are three variables to be taken into consideration.

Mixed pressure turbines are intended to operate on high pressure steam only when the supply of low-pressure steam is insufficient to handle the load. If the working range of the governor of the mixed pressure turbine, counted from minimum to maximum valve opening, is the same as that on the high pressure engine whose generator is connected in parallel with that driven by the mixed pressure turbine, then the load distribution will be proper throughout the range of the low-pressure working, assuming of course, the low-pressure supply to be adequate and the vacuum normal. If under these conditions, the speed of the mixed pressure turbine is decreased by increasing load to a point where the governor will open, or cause to be opened, one or more high-pressure supply valves, then such load conditions will also correspondingly decrease the speed of the high-pressure machine or machines, and the proper division of work between them will be preserved. If, however, the speed reduction of the mixed pressure machine is caused by a deficient steam supply or by a poor vacuum or both, and the high-pressure source is thus called upon to supply steam to this unit, then it will be found that the high-pressure machines have not been reduced in speed except to the extent that they are slowed down due to the tendency of the mixed pressure machine to drop its load and drag them back.

To state the matter in another way, if the speed reduction of the mixed pressure machine is due to lack of low pressure steam or to poor vacuum or to both and is great enough to cause a high pressure valve to open, then the generator driven thereby will carry less than its share of the load and will thereby endanger other machines on the line by overloading them. This is due to the fact that if there is a diminution in the supply of low-pressure steam or an impairment of the vacuum, the first valve whose opening does any good is the first high-pressure valve, and under normal governor adjustment this valve will not open until the speed is so low that all other high pressure engine driven generators connected in parallel on the same circuit have their valves wide open and are carrying full load or possibly overload. Under these conditions therefore it is necessary to adjust the governor of the mixed-pressure machine in order to make it pick up its share of the load.

In carrying out my invention, I provide a regulator which for convenience may be considered as being composed of a main and an auxiliary device. The main device is provided with a member that is associated and moves with the high-pressure valve mechanism, the latter being controlled by the speed governor. The said member is arranged to make and break an electric circuit at fixed contacts that are connected to an electric motor which motor is arranged to increase or decrease the tension of the synchronizing spring of the governor as occasion requires. The current for actuating the motor may be taken from any suitable source, such as the exciting circuit of the generator. The motor circuit may be made and broken directly, or it may be relayed.

The auxiliary device comprises a movable element carrying a contact which is moved in response to a change in the operating condition of the low-pressure end of the turbine, as by a falling off of the supply of low-pressure steam or an impairment of the vacuum, and stationary contacts coöperating therewith. These contacts are also connected with the motor circuit, and as will be fully explained hereinafter, coöperate with the contacts controlled by the speed governor to control the motor. That is to say, the main device and the auxiliary device form jointly a regulator for controlling the mixed-pressure machine.

By reason of the joint action of the parts of the regulator the motor is, as before stated, caused to vary the tension of the synchronizing spring of the governor. This means that the working range of the governor is changed. That is to say, with a 3% speed variation if normally the governor caused the high pressure valve to open at 1490 R. P. M., for example, it might cause it to open at 1500 R. P. M. after being adjusted. By "working range of the governor" is meant the operative speed range of the governor from no load to full load. The synchronizing spring referred to may be the synchronizing spring with which governors are commonly provided or it may be a separate spring.

Figure 2:
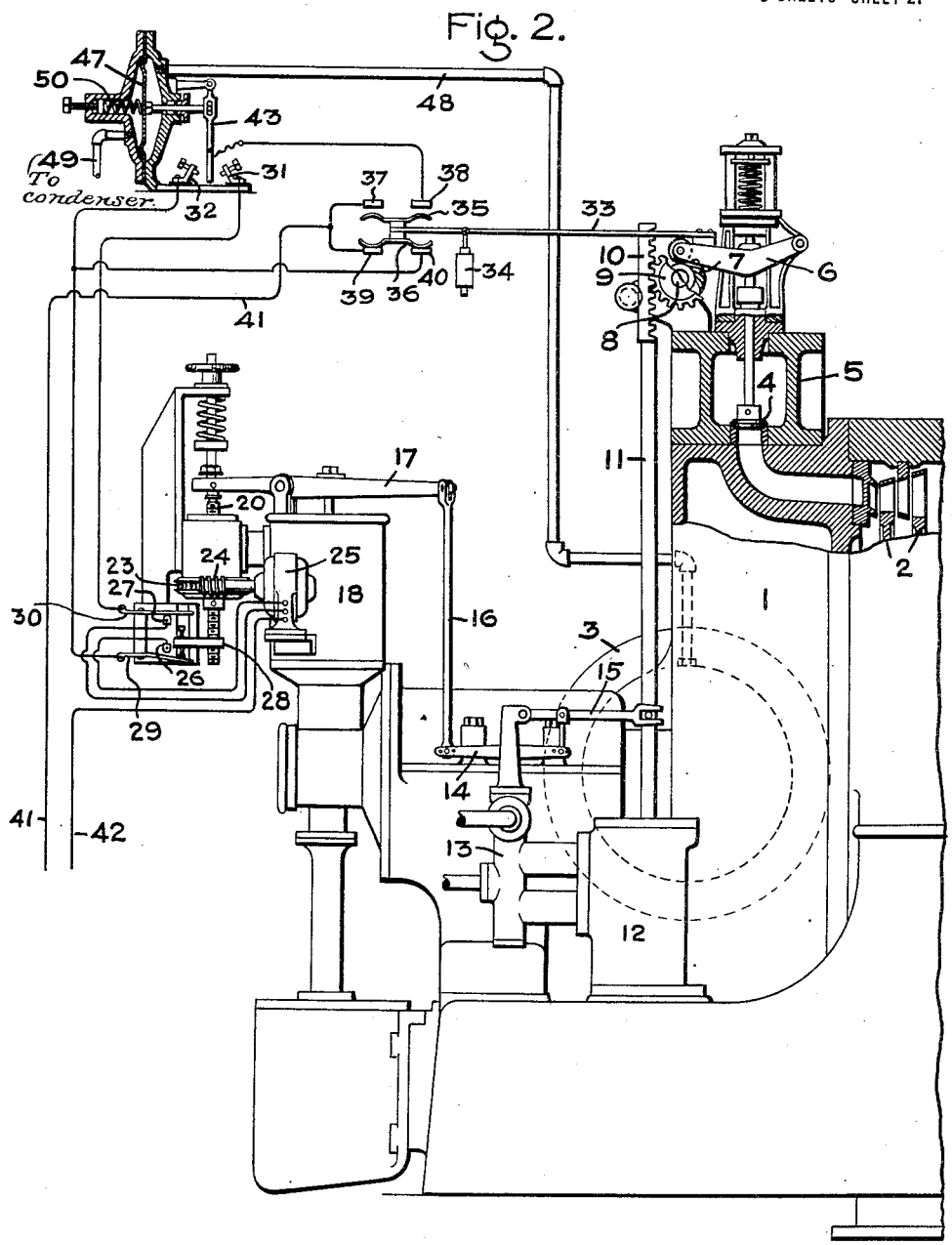
Figure 3:
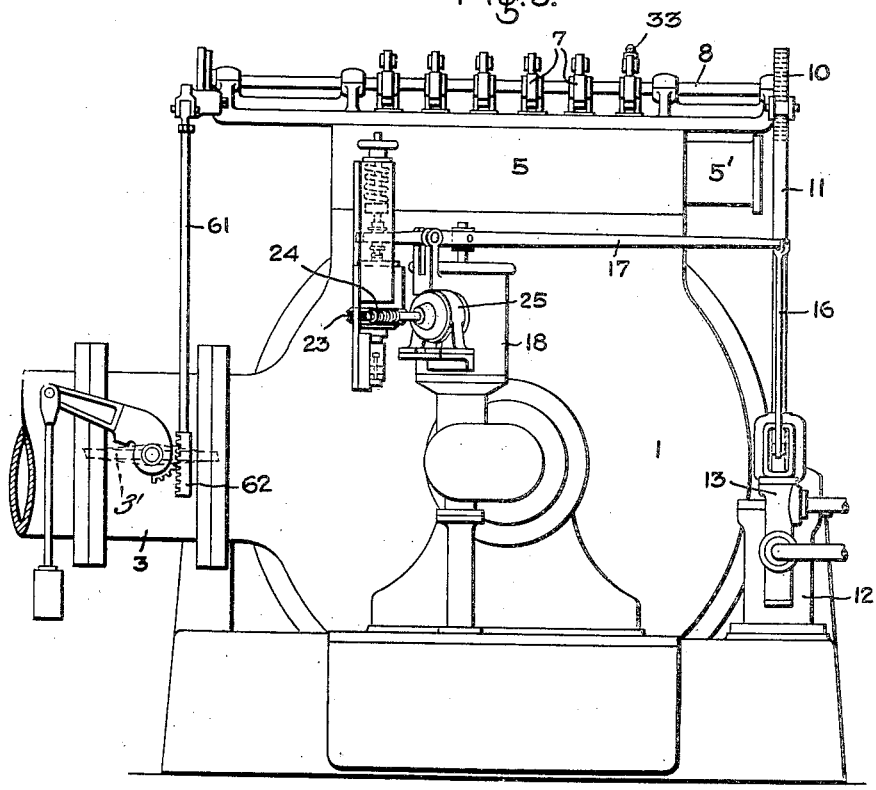
Figure 4:
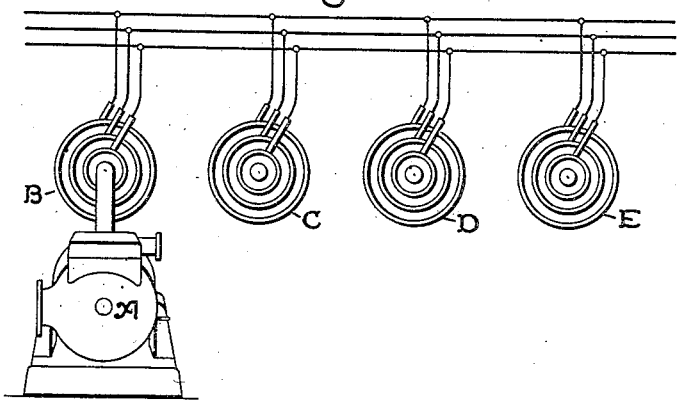

In the accompanying drawing, Figure 1 is a diagrammatic view of a mixed-pressure machine provided with a governing mechanism embodying the principles of my invention; Fig. 2 is a view similar to Fig. 1 illustrating a second form which my invention may take; Fig. 3 is a side elevation of a mixed-pressure machine showing one form of my improved mechanism arranged thereon, and Fig. 4 is a view showing a series of generators connected in parallel.

In both Figs. 1 and 2 the turbine and the main governing device are identical. They differ only in the auxiliary circuit-closing device.

The turbine is of the mixed pressure type, having a casing 1 containing one or more bucket wheels 2 to which low-pressure steam is admitted from the large main 3. High-pressure steam is admitted to the turbine through inlet 5' leading to steam chest 5 in which are located the nozzle valves 4 which control the admission of the high-pressure steam to the bucket wheels. Each of these valves 4 is lifted by a lever 6, which is actuated by a cam 7 on the cam shaft 8. This cam shaft also actuates the butterfly valve 3' controlling the admission of low-pressure steam through rod 61 and rack 62. A pinion 9 on cam shaft 8 meshes with a rack 10, carried by the piston rod 11 of a hydraulic motor 12, whose pilot valve in the casing 13 is connected to the floating lever 14 of the valve mechanism. One end of this lever is linked to a follow-up lever 15 pivotally connected with the piston rod 11. The other end of the lever 14 is connected by the rod 16 with the arm 17 of the speed governor 18 which is geared to the shaft of the turbine and consists of the usual pivoted weights acting on the arm 17. A synchronizing spring 19 is attached to the other end of the arm 17.

For the purpose of adjusting the synchronizing spring under the conditions pointed out above, a screw-threaded stem 20 is provided carrying a follower 21 bearing on said spring, and furnished with a nut 22 engaged with said stem. A worm gear 23 is attached to said stem and a worm 24 engages with said worm gear, and is mounted on the shaft of a small electric motor 25. The windings on this motor are so arranged that it will be reversed in direction by shifting the exciting current from one terminal 26 to the other 27. A nut traveling on the lower portion of the stem 20 carries a tappet 28 which can engage at either end of its travel with a spring contact 29, 30 and open the circuit at one or the other of the terminals 26, 27. The two spring contacts thus act as limit switches. They are connected respectively with two contacts 31, 32 in the auxiliary controlling device which will be described later.

The main controlling device is an arm 33 carried by the cam lever 7 of the first high-pressure nozzle valve. The arm is preferably somewhat flexible, and a dash-pot or other time limit device 34 retards its movements somewhat. At the free end of said arm are two bridging contacts 35, 36, each closing on a pair of stationary contacts 37 38, 39 40. Contacts 37 39 are connected with a wire 41 leading to a source of supply, such as a lighting circuit, or the exciter circuit for the generator driven by the turbine; the other side 42 of said circuit being connected with the motor. Contact 40 is connected with the contact 31, and contact 38 with a movable arm 43 adapted to close upon the two contacts 31 32.

In Fig. 1 the movable arm 43 is actuated by a current responsive device as an ammeter 44 in circuit with a current transformer 45 in the bus bars 46 of the generator driven by the mixed pressure machine. The instrument 44 accordingly responds to the load on this generator.

In Fig. 2, the movable arm 43 is connected to a flexible diaphragm 47 exposed on one side to the pressure of the low-pressure steam, by means of the pipe 48, and on the other side to the vacuum in the condenser, by means of the pipe 49. An adjustable spring 50 enables the tension of the diaphragm and the ratio between the pressures on opposite sides to be varied at will. In either instance it will be clear that in order to complete the circuit on the motor 25 through the limit switch 30 at a time when such limit switch is closed it is necessary that contact arm 43 be in engagement with contact 32 and that bridging contact 35 connects contacts 37 and 38, and in order to complete the motor circuit through the limit switch 29 when such limit switch is closed it is only necessary that contact arm 43 engage contact 31, or that bridging contact 36 connects contacts 39 and 40.

In Fig. 4 I have illustrated diagrammatically the mixed-pressure turbine A to which my improved controlling means has been applied as operating a generator B, which generator is connected in parallel with other generators C, D, and E. The generators C, D, and E are assumed to be driven by any suitable type of high-pressure engine units.

The operation of the invention is as follows: The mixed pressure turbine is assumed to be operating in parallel with other units. It is supplied normally with low-pressure steam, and is liable to lose occasionally a part or the whole of this supply, in which event the governor will open one or more high-pressure valves to supplement the depleted low-pressure steam. But this operation is liable to give rise to serious irregularities in the division of the load between the generator of the mixed turbine and those of ordinary high-pressure turbines in parallel therewith. For example, suppose the turbine shows down, the governor opening the low-pressure valve until it is wide open and then starting to open the high pressure valves. This may be caused either (a) by by very much load on the turbogenerator, or (b) by loss of low-pressure steam, or (c) by loss of vacuum in the condenser. In the first case, the governing mechanism will handle the situation properly; that is to say, if the load becomes extremely heavy, this turbine opens its high-pressure valves and still carries its proportion of the overload, while at the same time the other turbogenerators on the line are also slowing down under the retardation due to the same heavy load, and all will share in this extra work. But if, on the other hand, the slowing down which causes the first high-pressure valve to open is due to (b) loss of low-pressure steam, or (c) loss of vacuum, then the turbogenerator of this unit will carry less than its share of the load, because the other generators will only slow down, in so far as they are dragged back by this mixed-pressure turbine failing to carry its share of load, and will rapidly become overloaded to a dangerous degree. This will continue until the attendant adjusts by hand the synchronizing spring on the governor of the mixed-pressure turbine so as to cause it to open its high pressure valves at a less speed reduction than it would if set to use low-pressure steam. Now under these circumstances, my invention automatically adjusts the synchronizing spring.

Referring first to Fig. 1 and assuming the parts to be in the position as shown, all the high-pressure nozzles being closed, the mixed-pressure turbine will be operating on low-pressure steam and the speed-governor will regulate the turbine in the usual manner. The contact arm 43 will occupy a position depending on the load. For ordinary loads this will be between contacts 32 and 31. Contact 32 will usually be located at such a point as to be engaged by arm 43 at times when there is a load less than full load, or relatively light load on the machine. Contact 31 will usually be located at such a point as to be engaged by the arm 43 at times of substantially full load and overload. The exact location of these contacts, however, will depend upon the operating conditions of the particular installation to which the invention is applied. If now the machine slows down due to increase in load, the governor will operate first to use up all the low-pressure steam and when this becomes insufficient it will open one or more of the high-pressure nozzle valves. The opening of the first high-pressure nozzle valve will cause the bridging contact 35 to bridge contacts 37 and 38. This will not affect the synchronizing spring, however, as, since the opening was due to increased load, contact 43 would be at a point remote from contact 32 and at some point in the region of contact 31, depending on the load. If, on the other hand, the machine slows down, due to decrease in the supply of low-pressure steam, or to loss of vacuum or both, to such a point that the low-pressure steam no longer suffices to carry the load the high-pressure nozzles will again be brought into operation. Under these conditions, however, with the normal adjustment of the synchronizing spring the high-pressure nozzles would not be brought into operation in sufficient numbers to keep the machine from dropping the whole, or a part of its load, which would be taken up by the other machines which are in parallel with it. Under these conditions if the machine is operating at such a load that contact arm 43 is in engagement with contact 32, as soon as the first high-pressure valve opens contact 35 will bridge contacts 37 and 38 completing the circuit through motor 25 by way of conductor 42, motor 25, contact 27, limit switch 30, contact 32, contact arm 43, contact 38, bridging contact 35, contact 37, and conductor 41. This will start the motor and produce an adjustment of the synchronizing spring such that the opening of the high-pressure valves would correspond to a higher turbine speed, thus resulting in a quick speeding up of the turbine to resume its share of the load, carrying it with high-pressure instead of low-pressure steam, which is the purpose of the invention.

If the supply of low-pressure steam should fail at a time of relatively heavy load, then the turbine will momentarily drop its load until such time as contact arm 43 shall respond to the drop of load by engaging contact 32 to cause the synchronizing spring to be adjusted as will be apparent.

The limit switch 30 will be opened by the tappet 28 when the motor has moved the synchronizing spring as far as it ought to go. If the supply of low-pressure steam or the vacuum, or both—as the case may be—should be reëstablished, the turbine would then tend to speed up and take more than its share of the load. The motor will then be reversed to move the synchronizing spring back to its original normal adjustment. This may be brought about in two ways; i. e., either by the closing of all the high-pressure valves whereby the motor circuit will be closed by the contact 36 bridging contacts 39 and 40, or by the load increasing to such a point that contact arm 43 swings over and engages contact 31. The question as to which of these things will cause the readjustment will be dependent primarily upon the degree to which the low-pressure steam supply is reëstablished, and the load on the generators, which will determine whether or not the high-pressure valves will all be closed before the load reaches such a point that contact arm 43 engages contact 31. In either event the result will be the same.

Referring now to Fig. 2, the general principle of operation is the same as that already described in connection with Fig. 1. In this arrangement the contact arm 43 is directly under the control of the low-pressure steam pressure and the vacuum pressure. In other words, it is directly responsive to the drop in pressure across the low-pressure end of the turbine. The contact 32 is adjusted to such a position that with a given decrease in the drop in pressure across the low-pressure end of the turbine, contact arm 43 will engage therewith. Contact 31 is adjusted to a position such that with normal drop in pressure across the machine or a pressure slightly in excess thereof contact arm 43 will be in engagement therewith. If at any time the low-pressure steam supply should fall off or the vacuum become impaired so that contact arm 43 engages contact 32 and the turbine slows down to such an extent as to cause the first high-pressure valve to open, then the synchronizing spring will be adjusted as already explained in connection with Fig. 1 to cause more high-pressure valves to open. If the supply of low-pressure steam or the vacuum, as the case may be, is reëtablished, then the reverse circuit of the motor will be closed either by bridging contact 36 or by contact arm 43 and the synchronizing spring returned to normal position.

In either of the arrangements illustrated it will be clear that the auxiliary regulating device responds to the condition of the supply of low-pressure steam or, otherwise expressed, to the drop in pressure across the low pressure end of the turbine. In the arrangement shown in Fig. 1 the load on the turbine at a time when the high-pressure valves are brought into play is used as a measure of the condition of the low-pressure steam, while in Fig. 2 the condition of the low-pressure steam is measured directly.

It is therefore evident that my invention will preserve equalization in load division between parallel generators, by bringing up high-pressure reserves on the mixed-pressure unit when the exhaust steam partly or wholly fails or the vacuum is partly or wholly lost, and in this way preventing so great a drop of speed as to put all the other parallel generators on wide-open valves and consequent dangerous overloads.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a governing mechanism for mixed pressure turbines, the combination of a low pressure valve mechanism, a high pressure valve mechanism, supply conduits containing the valve mechanisms which convey motive fluid to the turbine, a speed governor which normally controls the valve mechanisms, and means which operates to change the normal working range of the governor in case a diminution in the supply of low pressure motive fluid occurs when the high pressure valve mechanism is operative.

2. In a governing mechanism for a mixed pressure turbine, the combination of a low-pressure valve, a high pressure valve, supply conduits containing the valves which convey motive fluid to the turbine, a speed governor that normally controls the valves, a device associated and moving with the high-pressure valve, and a device which is responsive to variations in load as distinguished from variations in speed, the two devices coöperating to change the working range of the speed governor.

3. In a governing mechanism for a mixed pressure turbine, the combination of a low-pressure valve, a high pressure valve, supply conduits containing the valves which convey motive fluid to the turbine, a speed governor having a synchronizing spring, said governor normally controlling the action of the valves, and a regulator for changing the working range of the governor, which comprises a device movable with the high-pressure valve, a device responsive to load changes, and a motor for adjusting the tension of the synchronizing spring, which is controlled by the joint action of the said devices.

4. In a governing mechanism for a mixed pressure turbine driven generator connected in parallel with another generator, the combination of separate sources of fluid supply, valves controlling the passage of fluid from said sources to the turbine, a speed governor which normally controls the successive action of the valves, a device which changes its position with the movements of one of the valves, an electrical device connected in circuit with the generator driven by the turbine and which is responsive to load changes in the generator, and means controlled by the joint action of the devices for changing the working range of the speed governor.

5. In a governing mechanism for a mixed-pressure turbo-generator set, the combination of low-pressure valve mechanism, high-pressure valve mechanism, supply conduits containing said mechanisms which convey motive fluid to the turbine, a speed governor normally controlling the action of the valve mechanisms, a device responsive to a falling-off of the load on the generator, a device controlled by the high-pressure valve mechanism, and means controlled jointly by the said two devices for adjusting the working range of the governor.

6. In a governing mechanism for a mixed-pressure turbine, the combination of low-pressure valve mechanism, high-pressure valve mechanism, supply conduits containing said mechanisms which convey motive fluid to the turbine, a speed governor normally controlling the action of the valve mechanisms, a device for adjusting the working range of said governor, and means which operates said device in case a diminution in the supply of low-pressure steam occurs when the high-pressure valve mechanism is operative.

7. In a governing mechanism for a mixed-pressure turbo-generator set, the combination of a low-pressure valve mechanism, a high-pressure valve mechanism, supply conduits containing said mechanisms which convey motive fluid to the turbine, a speed governor having a synchronizing spring, said governor normally controlling the action of the valve mechanisms, a device movable with the high-pressure valve mechanism, a device responsive to changes in load on the generator, and a motor for adjusting the tension of the synchronizing spring which is controlled by the joint action of the said devices.

8. In a governing mechanism for a mixed-pressure turbine, the combination of a low-pressure valve mechanism, a high-pressure valve mechanism, supply conduits containing said mechanisms which convey motive fluid to the turbine, a speed governor normally controlling the action of the valve mechanisms, means which operates to change the normal working range of the governor in case diminution in the supply of low-pressure motive fluid occurs when the high-pressure valve mechanism is operative, and means operated either by a restoration of the supply of low-pressure motive fluid or a closing of the high-pressure valve mechanism for restoring the normal working range of the governor.

In witness whereof, I have hereunto set my hand this 25th day of September, 1912.

JOHN G. CALLAN.

Witnesses:
  FLORENCE S. HARRIS,
  PERRY BARKER.